United States Patent
Rizvi et al.

(10) Patent No.: US 11,119,904 B2
(45) Date of Patent: Sep. 14, 2021

(54) COMPUTER UPDATE AND ERROR CORRECTION

(71) Applicant: VISA INTERNATIONAL SERVICE ASSOCIATION, San Francisco, CA (US)

(72) Inventors: Syed Rizvi, Highlands Ranch, CO (US); Dennis Thomas, Highlands Ranch, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/380,805

(22) Filed: Apr. 10, 2019

(65) Prior Publication Data
US 2020/0327046 A1  Oct. 15, 2020

(51) Int. Cl.
 *G06F 11/36* (2006.01)
 *G06F 9/451* (2018.01)
 *G06F 8/65* (2018.01)

(52) U.S. Cl.
 CPC ........... *G06F 11/3688* (2013.01); *G06F 8/65* (2013.01); *G06F 9/451* (2018.02); *G06F 11/3664* (2013.01); *G06F 11/3692* (2013.01)

(58) Field of Classification Search
 USPC ........................................................ 717/124
 See application file for complete search history.

(56) References Cited

U.S. PATENT DOCUMENTS

| | | | | |
|---|---|---|---|---|
| 8,010,396 B2* | 8/2011 | Gura | ...................... | G06Q 10/06 705/7.12 |
| 8,326,669 B2* | 12/2012 | Korupolu | ............ | G06F 11/0793 705/7.22 |
| 8,621,278 B2* | 12/2013 | Petukhov | ............ | G06F 11/0793 714/26 |
| 8,856,774 B1* | 10/2014 | Kulaga | ..................... | G06F 8/65 717/168 |
| 10,338,959 B2* | 7/2019 | Khan | ..................... | G06F 9/4843 |
| 10,365,932 B2* | 7/2019 | Roman | ................... | G06F 16/23 |
| 10,698,735 B2* | 6/2020 | Chen | ................... | H04L 43/0876 |
| 2008/0127041 A1* | 5/2008 | Gura | ..................... | G06Q 10/06 717/101 |

(Continued)

OTHER PUBLICATIONS

Dumitraş et al, "MetaMorphMagi: From Offline to Online Software Upgrades in Large-Scale IT Infrastructures", [Online], 2007, pp. 1-18, [Retrieved from internet on Apr. 30, 2021], <https://d1wqtxts1xzle7.cloudfront.net/8078711/MetaMorphMagi:>, (Year: 2007).*

*Primary Examiner* — S. Sough
*Assistant Examiner* — Zengpu Wei
(74) *Attorney, Agent, or Firm* — Loeb & Loeb LLP

(57) ABSTRACT

The system and methods may promptly test updates and error corrections in private networks before they are installed. Further, the updates and errors corrections may be stored in a database and may be available to others on the private network. In addition, the updates and errors may be evaluated in an online environment to determine a safe and efficient manner to install the updates and error corrections. The system and methods may also review additional computers and determine necessary updates, error corrections and the safest and most efficient manner to install the updates.

20 Claims, 7 Drawing Sheets

(56) References Cited

U.S. PATENT DOCUMENTS

| | | | |
|---|---|---|---|
| 2008/0262890 A1* | 10/2008 | Korupolu | G06F 11/0793 |
| | | | 705/7.22 |
| 2013/0007527 A1* | 1/2013 | Petukhov | G06F 11/0793 |
| | | | 714/37 |
| 2015/0280993 A1* | 10/2015 | Gourlay | H04L 41/0893 |
| | | | 370/254 |
| 2017/0010880 A1* | 1/2017 | Yamazaki | G06F 8/656 |
| 2017/0017519 A1* | 1/2017 | Khan | G06F 9/4881 |
| 2019/0250949 A1* | 8/2019 | Chen | G06F 9/505 |

\* cited by examiner

| CRITICAL UPDATES | LEVEL | TIMING |
|---|---|---|
| Input vector | ***** | Sunday evening 3/20 |
| Trojan horse virus | ***** | Monday morning 3/21 |
| CRITICAL SOLUTIONS | | |
| Math overflow | ***** | Monday morning 3/21 |
| Bad card read data | ***** | Sunday evening 3/20 |
| PENDING UPDATES | | |
| New logo from Merchant | ** | Wednesday night 3/23 |
| PENDING SOLUTIONS | | |
| Merchant catalog renumber | *** | Wednesday nigh 3/23 |

FIG. 5

COMPUTER UPDATE AND ERROR CORRECTION

BACKGROUND

Computer systems routinely require maintenance and correction of errors. Correction of error and maintenance may be especially important in systems that have proprietary software. Similarly, systems that store sensitive data, such as data on private network like a private payment network, may be especially critical to have errors corrected and maintenance performed swiftly. Challenges occur when the private network is especially large and has a large number of servers and proprietary programs. Further, some of the proprietary programs used in some parts of the world may not be the same as proprietary software used in other parts of the world.

Testing error corrections and maintenance updates is especially risky as problems may cause transactions to fail or worse, which would greatly reduce the trust in the private network and the payment systems that use the private network.

In addition, as the systems may be so spread across the world, a problem noticed on one side of the world may not be noticed on the other side of the world. Solutions created on one side of the world may not be known to system administrators on the other side of the world, resulting in duplicate effort to correct the same problem or a solution may not be applied consistently across the network resulting in additional problems as the network will no longer be consistent across nodes of the network.

SUMMARY

The system and methods may provide numerous systems and methods to ensure updates and error corrections are promptly tested before they are installed. Further, the updates and errors corrections may be stored in a database and may be available to others on the private network. In addition, the updates and errors may be evaluated to determine a safe and efficient manner to install the updates and error corrections. The system and methods may also review additional computers and determine necessary updates, error corrections and the safest and most efficient manner to install the updates.

BRIEF DESCRIPTION OF THE DRAWINGS

FIG. 5 may be an illustration of a user interface according to one or more embodiments;

SPECIFICATION

Figure 1:
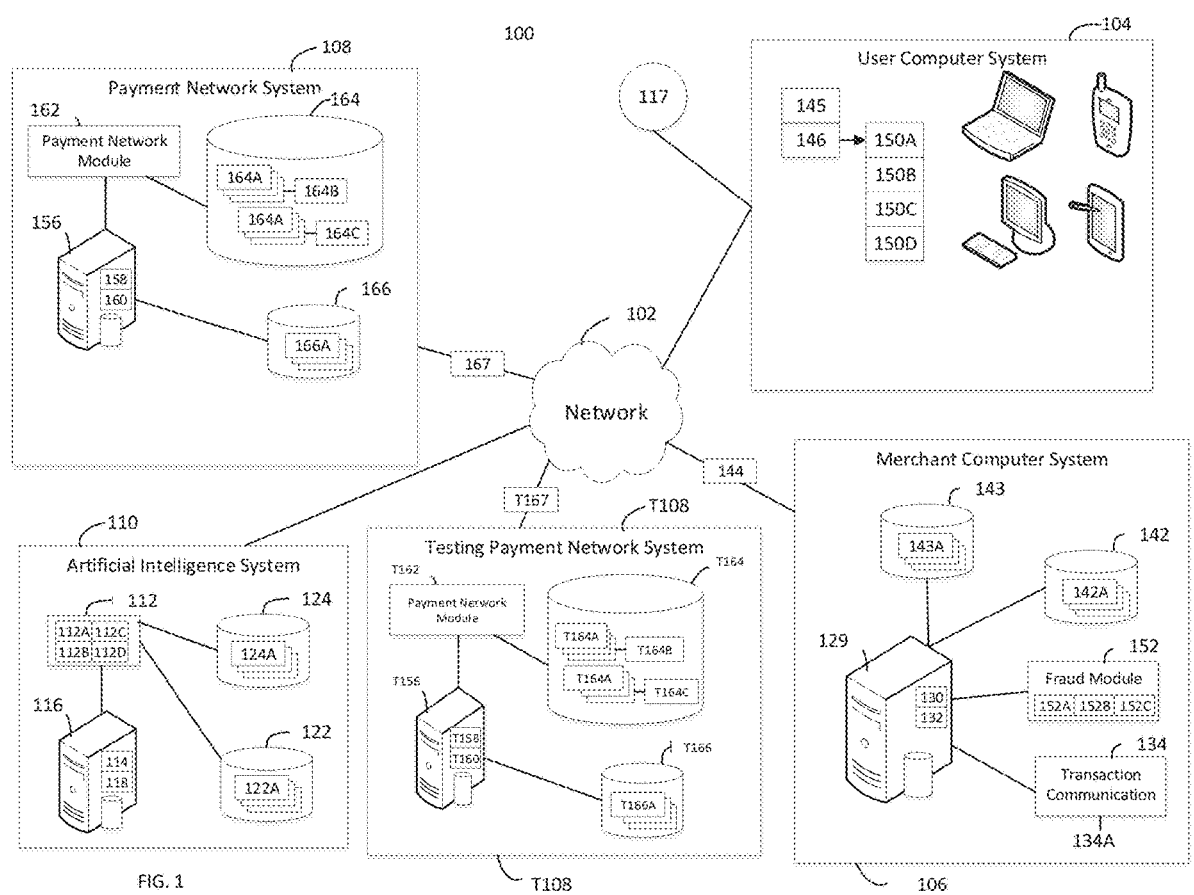
FIG. 1 which may be an illustration of a block diagram of a system according to one or more embodiments.

The present system, method and tangible memory device now will be described more fully with reference to the accompanying drawings, which form a part hereof, and which show, by way of illustration, specific exemplary embodiments by which the system, method and tangible memory device may be practiced. These illustrations and exemplary embodiments are presented with the understanding that the present disclosure is an exemplification of the principles of one or more system, method and tangible memory devices and is not intended to limit any one of the system, method and tangible memory devices to the embodiments illustrated. The system, method and tangible memory device may be embodied in many different forms and should not be construed as limited to the embodiments set forth herein; rather, these embodiments are provided so that this disclosure will be thorough and complete, and will fully convey the scope of the system, method and tangible memory device to those skilled in the art. Among other things, the present system, method and tangible memory device may be embodied as methods, systems, computer readable media, apparatuses, components, or devices. Accordingly, the present system, method and tangible memory device may take the form of an entirely hardware embodiment, an entirely software embodiment, or an embodiment combining software and hardware aspects. The hardware may be local, may be remote or may be a combination of local and remote. The following detailed description is, therefore, not to be taken in a limiting sense.

Computer systems routinely require maintenance and correction of errors. Correction of error and maintenance may be especially important in systems that have proprietary software. Similarly, systems that store sensitive data, such as data on private network like a private payment network, may be especially critical to have errors corrected and maintenance performed swiftly. Challenges occur when the private network is especially large and has a large number of servers and proprietary programs. Further, some of the proprietary programs used in some parts of the world may not be the same as proprietary software used in other parts of the world.

Testing error corrections and maintenance updates is especially risky as problems may cause transactions to fail or worse, which would greatly reduce the trust in the private network and the payment systems that use the private network.

In addition, as the systems may be so spread across the world, a problem noticed on one side of the world may not be noticed on the other side of the world. Solutions created on one side of the world may not be known to system administrators on the other side of the world, resulting in duplicate effort to correct the same problem or a solution may not be applied consistently across the network resulting in additional problems as the network will no longer be consistent across nodes of the network.

The system may provide numerous systems and methods to ensure updates and error corrections are promptly tested before they are installed. Further, the updates and errors corrections may be stored in a database and may be available to others on the private network. In addition, the updates and errors may be evaluated to determine a safe and efficient manner to install the updates and error corrections. The system and methods may also review additional computers and determine necessary updates, error corrections and the safest and most efficient manner to install the updates.

As a result of the system, numerous technical problems are addressed. One technical problem is how to test error corrections and updates for extremely sensitive computer systems when the systems are on a private network and operate proprietary software. In addition, the system determines whether the proposed error corrections and updates will conflict with any existing code before the error corrections and updates are installed on any online systems. In addition, the proposed error corrections and code updates may be ranked in a variety of terms which may vary but the situation such as risk, complexity, time to install, etc. where determining the order and necessity of error corrections and updates has long been a technical problem. The error corrections and updates may be added to a database such that a solution may be available and distributed across the entire network such that the various servers may be consistent which has been a long felt technical problem. Additional computers may be analyzed by the system to find needed error corrections and updates which also has been a technical problem. Logically, there are additional technical problems and solutions and describing them all would be virtually impossible.

Referring to FIG. 1 which may be an illustration of the system in accordance one or more embodiments. FIG. 1 generally illustrates one embodiment of a private network such as a payment system that may require updates and system updates. The system 100 may include a computer network 102 that links one or more systems and computer components. In some embodiments, the system 100 includes a user computer system 104, a merchant computer system 106, a payment network system 108, and a transaction analysis system which may embody artificial intelligence 110.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users and merchants.

The various modules may be implemented as computer-readable storage memories containing computer-readable instructions (e.g., software) for execution by one or more processors of the system 100 within a specialized or unique computing device. The modules may perform the various tasks, methods, blocks, sub-modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, e.g., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks generally facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 145 and memory 146. The user computing system 104 may include a server, a mobile computing device, a smartphone, a tablet computer, a Wi-Fi-enabled device, wearable computing device or other personal computing device capable of wireless or wired communication, a thin client, or other known type of computing device. The memory 146 may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 108. In some embodiments, a responsible party 117 is in communication with the user computer system 104.

In some embodiments, a module of the user computer system 104 may pass user payment data to other components of the system 100 to facilitate determining a real-time transaction analysis determination. For example, one or more of the operating system 150A, a browser module 150B, a communication module 150C, and an electronic wallet module 150D may pass data to a merchant computer system 106 and/or to the payment network system 108 to facilitate a payment transaction for a good or service. Data passed from the user computer system 104 to other components of the system may include a customer name, a customer ID (e.g., a Personal Account Number or "PAN"), address, current location, and other data.

The merchant computer system 106 may include a computing device such as a merchant server 129 including a processor 130 and memory 132 including components to facilitate transactions with the user computer system 104 and/or a payment device via other entities of the system 100. In some embodiments, the memory 132 may include a transaction communication module 134. The transaction communication module 134 may include instructions to send merchant messages 134A to other entities (e.g., 104, 108, 110) of the system 100 to indicate a transaction has been initiated with the user computer system 104 and/or payment device including payment device data and other data as herein described. The merchant computer system 106 may include a merchant transaction repository 142 and instructions to store payment and other merchant transaction data 142A within the transaction repository 142. The merchant transaction data 142A may only correspond to transactions for products with the particular merchant or group of merchants having a merchant profile (e.g., 164B, 164C) at the payment network system 108.

The merchant computer system 106 may also include a product repository 143 and instructions to store product data 143A within the product repository 143. For each product offered by the merchant computer system 106, the product data 143A may include a product name, a product UPC code, an item description, an item category, an item price, a number of units sold at a given price, a merchant ID, a merchant location, a customer location, a calendar week, a date, a historical price of the product, a merchant phone number(s) and other information related to the product. In some embodiments, the merchant computer system 106 may send merchant payment data corresponding to a payment device to the payment network system 108 or other entities of the system 100, or receive user payment data from the user computer system 104 in an electronic wallet-based or other computer-based transaction between the user computer system 104 and the merchant computer system 106.

The merchant computer system 106 may also include a fraud module 152 having instructions to facilitate determining fraudulent transactions offered by the merchant computer system 106 to the user computer system 104. Thus, the transaction volume analysis and location information may be accurate.

The fraud API 152A may include instructions to access one or more backend components (e.g., the payment network system 108, the artificial intelligence engine 110, etc.) and/or the local fraud module 152 to configure a fraud graphical interface 152B to dynamically present and apply the transaction analysis data 144 to products or services 143A offered by the merchant computer system 106 to the user computer system 104. A merchant historical fraud determination module 152C may include instructions to mine merchant transaction data 143A and determine a list of past fraudulent merchants to obtain historical fraud information on the merchant.

The payment network system 108 may include a payment server 156 including a processor 158 and memory 160. The memory 160 may include a payment network module 162 including instructions to facilitate payment between parties (e.g., one or more users, merchants, etc.) using the payment system 100. The module 162 may be communicably connected to an account holder data repository 164 including payment network account data 164A.

The payment network account data 164A may include any data to facilitate payment and other funds transfers between system entities (e.g., 104, 106). For example, the payment network account data 164A may include account identification data, account history data, payment device data, etc. The module 162 may also be communicably connected to a payment network system transaction repository 166 including payment network system global transaction data 166A.

The global transaction data 166A may include any data corresponding to a transaction employing the system 100 and a payment device. For example, the global transaction data 166A may include, for each transaction across a plurality of merchants, data related to a payment or other transaction using a PAN, account identification data, a product or service name, a product or service UPC code, an item or service description, an item or service category, an item or service price, a number of units sold at a given price, a merchant ID, a merchant location, a merchant phone number(s), a customer location, a calendar week, and a date, corresponding to the product data 143A for the product that was the subject of the transaction or a merchant phone number. The module 162 may also include instructions to send payment messages 167 to other entities and components of the system 100 in order to complete transactions between users of the user computer system 104 and merchants of the merchant computer system 106 who are both account holders within the payment network system 108.

The testing payment network system T108 may attempt to mimic the payment network system 108 and may include a testing payment server T156 including a tesing processor T158 and tesing memory T160. The testing memory T160 may include a testing payment network module T162 including instructions to facilitate payment between parties (e.g., one or more users, merchants, etc.) using the payment system 100. The testing module T162 may be communicably connected to a testing account holder data repository T164 including testing payment network account data T164A.

The testing payment network account data T164A may include any test data to facilitate testing payment and other funds transfers between system entities (e.g., 104, 106). For example, the testing payment network account data T164A may include test account identification data, test account history data, test payment device data, etc. The test module T162 may also be communicably connected to a testing payment network system transaction repository T166 including testing payment network system global transaction data T166A.

The testing global transaction data T166A may include any test data corresponding to a test transaction employing the system 100 and a payment device. For example, the testing global transaction data T166A may include, for each transaction across a plurality of merchants, test data related to a payment or other transaction using a PAN, test account identification data, a test product or test service name, a test product or test service UPC code, a test item or test service description, a test item or test service category, a test item or test service price, a test number of units sold at a given price, a test merchant ID, a test merchant location, a test merchant phone number(s), a test customer location, a test calendar week, and a test date, corresponding to the product data 143A for the product that was the subject of the transaction or a test merchant phone number. The test module T162 may also include instructions to send test payment messages T167 to other entities and components of the system 100 in order to complete test transactions between users of the user computer system 104 and merchants of the merchant computer system 106 who are both account holders within the test payment network system T108.

The artificial intelligence engine 110 may include one or more instruction modules including a transaction analysis module 112 that, generally, may include instructions to cause a processor 114 of a transaction analysis server 116 to functionally communicate with a plurality of other computer-executable steps or sub-modules, e.g., sub-modules 112A, 112B, 112C, 112D and components of the system 100 via the network 102. These modules 112A, 112B, 112C, 112D may include instructions that, upon loading into the server memory 118 and execution by one or more computer processors 114, dynamically determine transaction analysis data for a product 143A or a merchant 106 using various stores of data 122A, 124A in one more databases 122, 124.

As an example, sub-module 112A may be dedicated to dynamically determine transaction analysis data based on transaction data associated with a merchant 106.

Figure 2:
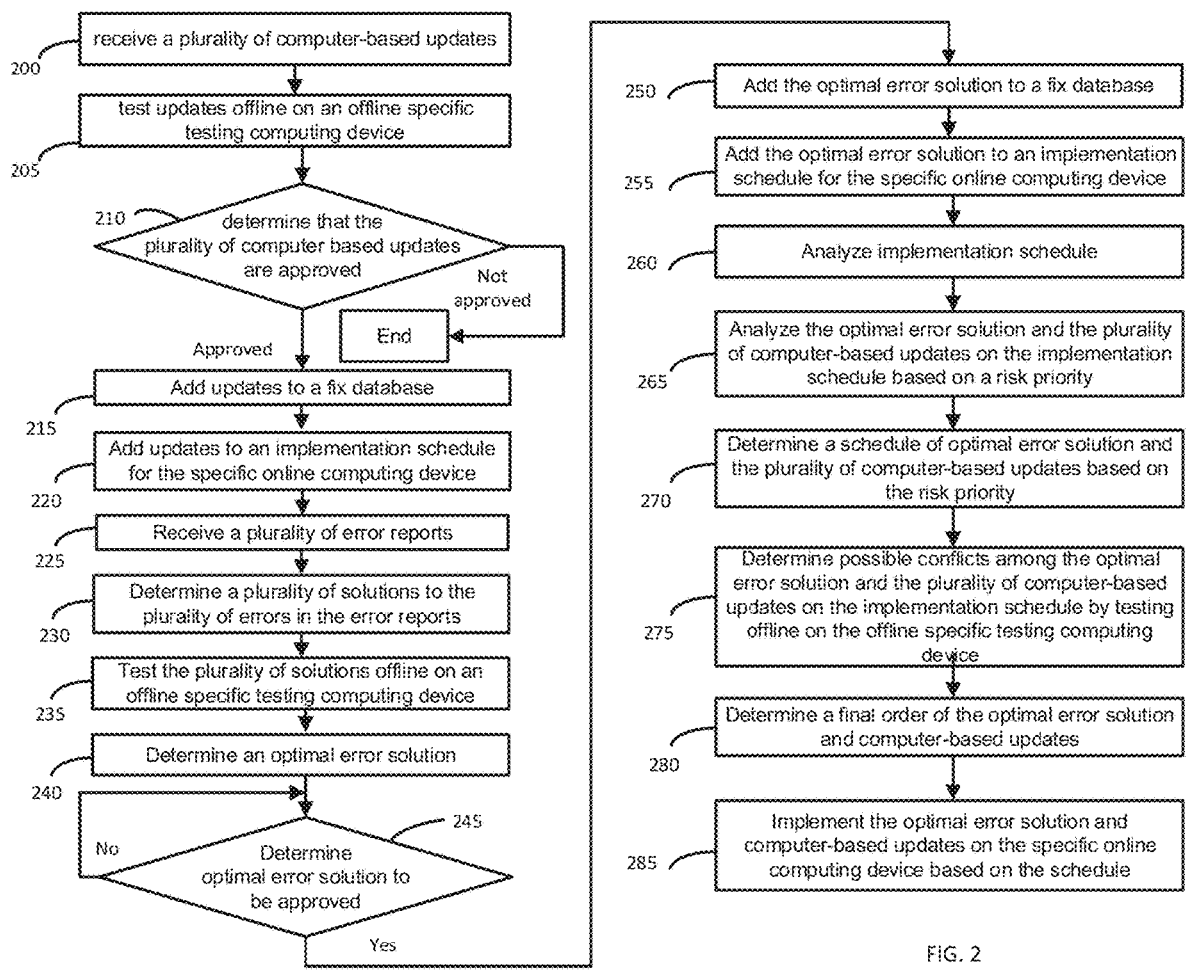
FIG. 2 may be a flow diagram of a process of using the system according to one or more embodiments.

FIG. 2 may be a method in accordance with one or more embodiments. The method may use the system as described in FIG. 1. At block 200, the processor may be physically configured to receive a plurality of computer-based updates. Examples of such computer-based updates include, but are not limited to: bug fixes, security updates, software upgrades, security improvements, new encryption algorithms, new token software, new processors, new trusted security modules, new memory, new communication hardware, etc. The updates may be for proprietary and non-proprietary applications. The updates may be received electronically of may be delivered on a physical storage medium. The updates may also indicate the level of importance of the update and the applications to which the updates apply. There also may be an estimate of how long it will take to install the update and how much memory may be needed to install the update. The update may also include update notes such as the problem being addressed, a high level description of the solution and any known interdependencies that may be affected.

At block 205, the plurality of computer-based updates may be tested offline on an offline specific testing computing device or system such as the testing payment system T108 in FIG. 1. The offline specific testing computing system T108 may be physically configured to mimic the online computing environment as closely as possible. For example, the offline may have similar processors and memories as the online system. In FIG. 1, the various testing elements may start with the letter T and may be as similar as possible as the online versions. More specifically, the offline specific testing computing device may include the same computing applications as the online environment. In addition, messages may be communicated in a manner that is similar to the online environment where pseudo communications may be in a similar volume and form to the online environment to best mimic the online environment.

At block 210, the method may determine that the plurality of computer based updates are approved. If the updates are not approved, the method may end. The approval may occur through testing the update on the offline system as described in block 205. In some examples, the updates may not be approved such as when there is a conflict between old applications and the updates or when the update requires more memory than systems on the network may be able to provide. As a result, such updates may not be approved.

At block 215, based on the determination that the plurality of computer-based updates are approved, the computer based updates may be added to a fix database. The database may be available to other members of the network such that other members of the network may not have to proceed through the rigorous testing that other members of the networks may have completed. Further, some network members may miss an update and the database may be used to promptly and efficiently update the computer system in question by simply accessing the update from the database.

At block 220, based on the determination that the plurality of computer-based updates are approved, the plurality of computer-based updates may be added to an implementation schedule for the specific online computing device. Logically, online devices may need to be online. If an online computing device is taken offline, alternative computing devices may need to take over for the online device. The switching of devices from an online state to an offline state may require careful scheduling such that the network may continue to operate without a drop in performance. The scheduling may take on a variety of forms, from redirecting network traffic for the specific computer to another computer or to shutting down a larger number of devices and updating them all at the same time during a period of low network traffic.

In some embodiments, the specific online computer may be on a private network. A private network may limit traffic to authorized members of the network. Security may be of great importance and significant steps may be taken to ensure the network is used by members of the private network. As a result, traffic on the network may be closely monitored to ensure only members are using the network. As a result, network updates may be reviewed more closely than traditional updates.

Similarly, the computing devices on the private network may execute proprietary software. The software may be specifically written to perform a task and many of the modern day graphical user interfaces may not be present as people who will use the proprietary software may be software professionals. Similarly, the network security aspects of the software may be different as the network itself may be private and the updates may be subject to different constraints than software on a public network.

At block 225, a plurality of computer-based error reports may be received. Unfortunately, errors in software, even proprietary software, may occur. The cause may be many and varied but the reality is that errors occur, and must be reported in order to be corrected. The reports may be formatted in a known formal and may be communicated to an authority in a known protocol.

At block 230, a plurality of solutions to the plurality of computer-based errors in the error reports may be determined. Logically, there may be many solutions to a software or hardware errors. In some embodiments, a piece of hardware may need to be replaced or expanded or updated. In other embodiments, the computer executable steps may need to be updated. In yet another embodiment, a new code section may be tested. Similarly, a new security improvement may be the solution. In yet another embodiment, a new communication device may be the solution. The various solutions may be created by a system administrator or may be created by an additional computer such as an artificial learning computer and may be tracked as some solutions may be less challenging or expensive than other solutions.

At block 235, the plurality of solutions may be tested offline on an offline specific testing computing device or system such as the testing system T108 of FIG. 1. As mentioned previously, the offline specific testing computing device may mirror the online environment as closely as possible. The offline testing may be undertaken to try to fix the error but do so in a way that protects the online system. By testing possible solutions offline, possible damage to the online system may be identified and eliminated, if possible. The testing may occur automatically or may occur with human interaction. In the embodiment where the testing is automatic, the test change may be submitted to the system T108 using an API in the case of certain software or using a protocol which is known to the submitting agent and the testing system T108. Logically, the results of the testing may be received by a message which may be communicated via a known protocol.

At block 240, an optimal error solution may be determined. There may be more than one solution to an error. For example, replacing an entire server may correct the error. However, the error may be limited to a single memory module and a more efficient solution may be to replace the memory module rather than the entire server. Similarly, there may be a software solution to the error.

The manner of determining the optimal solution may be many and varied. In some embodiments, the various solutions are given a score in a variety of categories such as time required to implement the solution, the cost of the solution, the complexity of the solution, the possibility of unwanted additional issues, the security of the solution, the length of time the solution is expected to operate, etc. Each of these categories may be given a weight and the various solutions may then be ranked. Logically, different entities may have different weights on the categories and different entities may have entirely different categories. As an example, security may take on greater importance to some entities with cost being a lower concern.

At block 245, the optimal error solution may be determined to be approved. For example, a solution may cause a product from a first supplier to be replaced with a product from a second supplier. Such a change may correct the error but may also cause issues with the procurement department or pre-existing contractual agreements. The change in parts may also result in changes to other aspects in the network which may not be acceptable. Thus, the solution may have to be approved by a second party or an authority.

At block 250, based on the determination that the optimal error solution is approved, the optimal error solution may be added to a fix database. As mentioned previously, the fix database may be accessible to other approved members of the network such that the same problem will not have to be solved numerous times and that consistency may be maintained across the network. In addition, the database may be used to analyze other systems to see if the systems under analysis have the most recent updates and error corrections.

At block 255, based on the determination that the optimal error solution is approved, the optimal error solution may be added to an implementation schedule for the specific online computing device. Again, if a computing system is online, it may be taken offline to fix it. A schedule may be created to make sure other computing systems may be in place to take on the computing needs while the specific computing device is offline.

At block 260, the implementation schedule may be analyzed. The implementation schedule may have updates and error corrections. At block 265, the optimal error solution and the plurality of computer-based updates on the implementation schedule may be analyzed based on a risk priority. Logically, some changes may be more important than others based on the risk to the computing device of the network. The risk may be given a number and the changes may be ranked according to the risk.

At block 270, a schedule of optimal error solution and the plurality of computer-based updates may be determined based on the risk priority. High risk error solutions and updates may need to be installed promptly while other solutions with a lower risk score may be installed at a more convenient time in the future. In addition, the solutions and updates are a change from the normal routine and there may be a desire to keep the interruptions to the network to a minimum. Further, the schedule may be useful to determine how long an update may take.

At block 275, possible conflicts among the optimal error solution and the plurality of computer-based updates on the implementation schedule may be determined by testing offline on the offline specific testing computing device. As mentioned previously, it may be useful to test the solutions and updates on offline servers before implementing the solutions and updates on a live system.

At block 280, a final order of the optimal error solution and computer-based updates may be determined. The order may matter as systems may be dependent on one another. For example, update A may depend on update B being installed in advance of update A. As another example, update F may be critical and may need to be installed as soon as possible.

At block 285, the optimal error solution and computer-based updates may be implemented on the specific online computing device based on the schedule. The implementation may occur in a way that causes minimal disruption to the online system. For example, the implementation may occur when online traffic is low such as at night or on days when network traffic is low such as Sunday. In addition, the traffic to the system being implemented may be routed to another system and the block 285 may ensure the system that is covering for the implementing system may be online.

In some embodiments, artificial intelligence may be used to determine the order of the computer based updates and error solutions. By studying past updates and error corrections, future updates and error correction may be better managed. As an example, an update to a loyalty system may be complicated due to the large number of vendors and individuals that use the system. Updating the system may have numerous unintended consequences. By studying past updates and error fixes, better solutions may be obtained that may have fewer unintended consequences.

Figure 3:
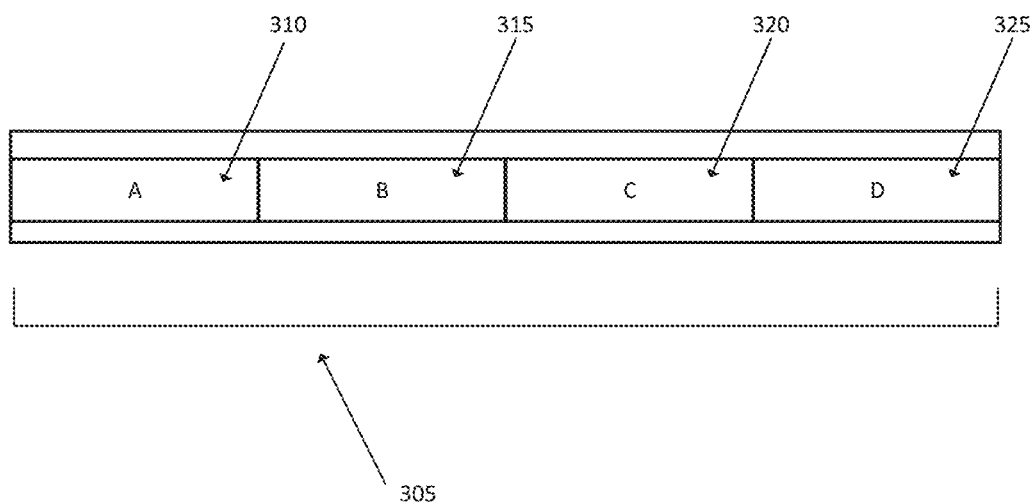
FIG. 3 may be an illustration of a data set used to train a learning algorithm according to one or more embodiments.
Figure 4A:
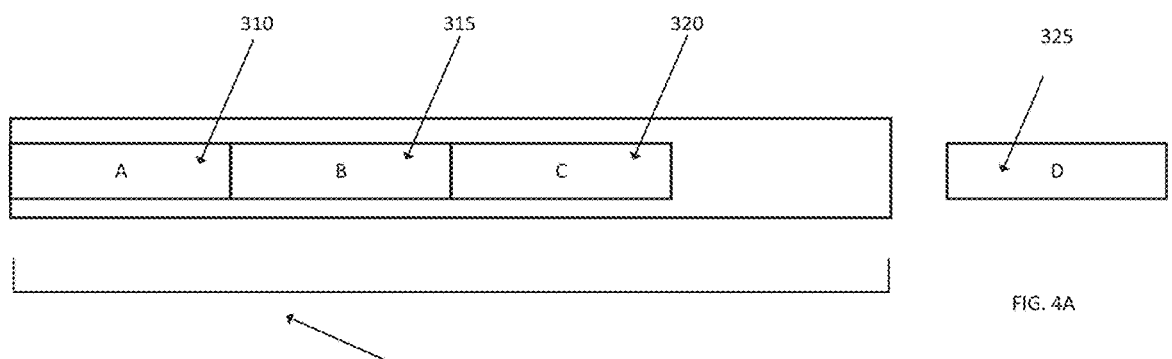
FIG. 4a may be an illustration of a data set being used to train a learning algorithm according to one or more embodiments.
Figure 4B:
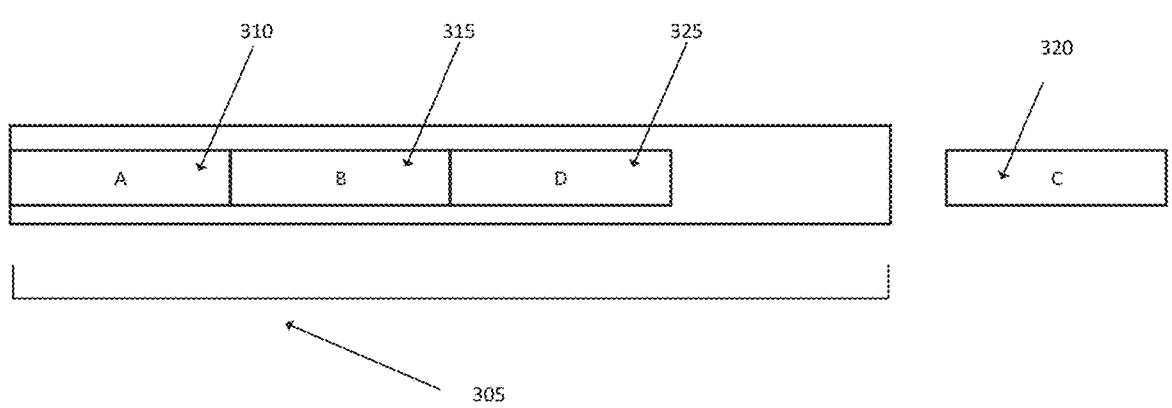
FIG. 4b may be an illustration of a data set being used to train a learning algorithm according to one or more embodiments.

FIG. 3 may illustrate a sample Artificial Intelligence (AI) training data according to one or more embodiments. As an example and not a limitation, an artificial intelligence system may trained by analyzing a set of training data 305. The training data may be broken into sets, such as set A 310, set B 315, set C 320 and set D 325. As illustrated in FIG. 4A, one set may be using as a testing set (say set D 325) and the remaining sets may be used as training set (set A 310, set B 315 and set C 320). The artificial intelligence system may analyze the training set (set A 310, set B 315 and set C 320) and use the testing set (set D 325) to test the model create from the training data. Then the data sets may shift as illustrated in FIG. 4B, where the test data set may be added to the training data sets (say set A 310, set B 315 and set D 325) and one of the training data sets that have not been used to test before (say set C 320) may be used as the test data set. The analysis of the training data (set A 310, set B 315 and set D 325) may occur again with the new testing set (set C 320) being used to test the model and the model may be refined. The rotation of data sets may occur repeatedly until all the data sets have been used as the test data sets. The model then may be considered complete and the model may then be used on additional data sets.

In the specific case, past updates and fixes may be analyzed regarding which modules they used of required to execute operations, the end result and any other modules that may be affected. Artificial intelligence may be used to help identity which modules may need special care when receiving updates or solutions based on past experience in installing updates or solutions. Further additional steps may be identified from past experiences which may be useful in eliminating problems in the future updates or fixes.

The system may also create a user interface to illustrate the planned optimal error solution and computer-based updates for the specific computing device as described in the method of FIG. 5. The user interface 500 may display the name of the update or error solution such as CRITICAL UPDATES 505, CRITICAL SOLUTIONS 510, PENDING UPDATES 515 and PENDING SOLUTIONS 520, the name of the change like input vector update 525 or Trojan hours virus 530, the level of importance 535 of the update and when the update will take place 540. Of course, other data is possible and the data may be displayed in an entertaining graphical fashion.

Figure 6:
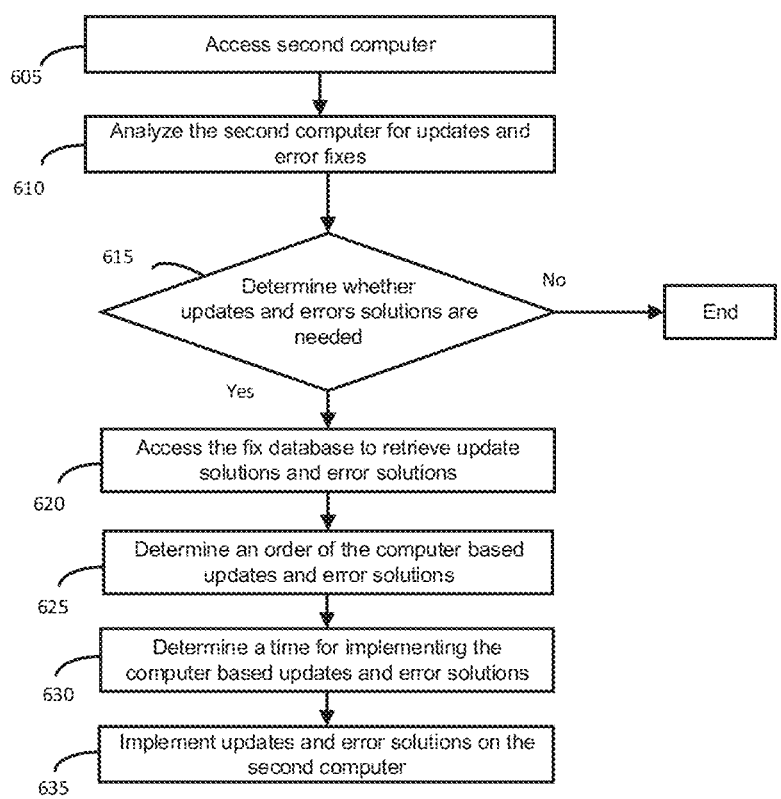
FIG. 6 may be a method in accordance with one or more embodiments according to one or more embodiments.

In another aspect, the fix database may be available to additional computers. FIG. 6 may illustrate how the database may be available to additional computers. At block 605, a second computer may be accessed. The second computer may be accessed through a network. The access may be secure and numerous step may be taken to ensure the access is secure and trustworthy. In some embodiments, a key exchange may occur to ensure the access is trustworthy. Other methods such as second channel communication may be used to verify the trustworthiness of the access. Logically, other methods of ensuring security are possible and are contemplated.

At block 610, the system may analyze the second computer for updates and error fixes. As noted previously, updates and error solutions may be installed at a variety of times and in a variety of orders. Further, the urgency of the updates may vary system by system and some updates and fixes may be installed on some systems and not on others. The analysis may compare the updates and error solutions in the database to the updates and error solutions on the second computer being analyzed.

At block 615, the system may determine that updates and errors solutions are needed on the second computer. By comparing the updates and error solutions available in the database to the installed updates and error solutions, missing updates and error solutions may be determined. If updates or error solutions are not needed, the method may end.

At block 620, based on the determination if updates and error solutions are needed on the second computer, the fix database may be accessed to retrieve update solutions and error solutions. At block 625, an order of the computer based updates and error solutions may be determined. At block 630, a time for implementing the computer based updates and error solutions may be determined on the second computer. At block 635, the computer based updates and error solutions may be implemented on the second computer.

Figure 7:
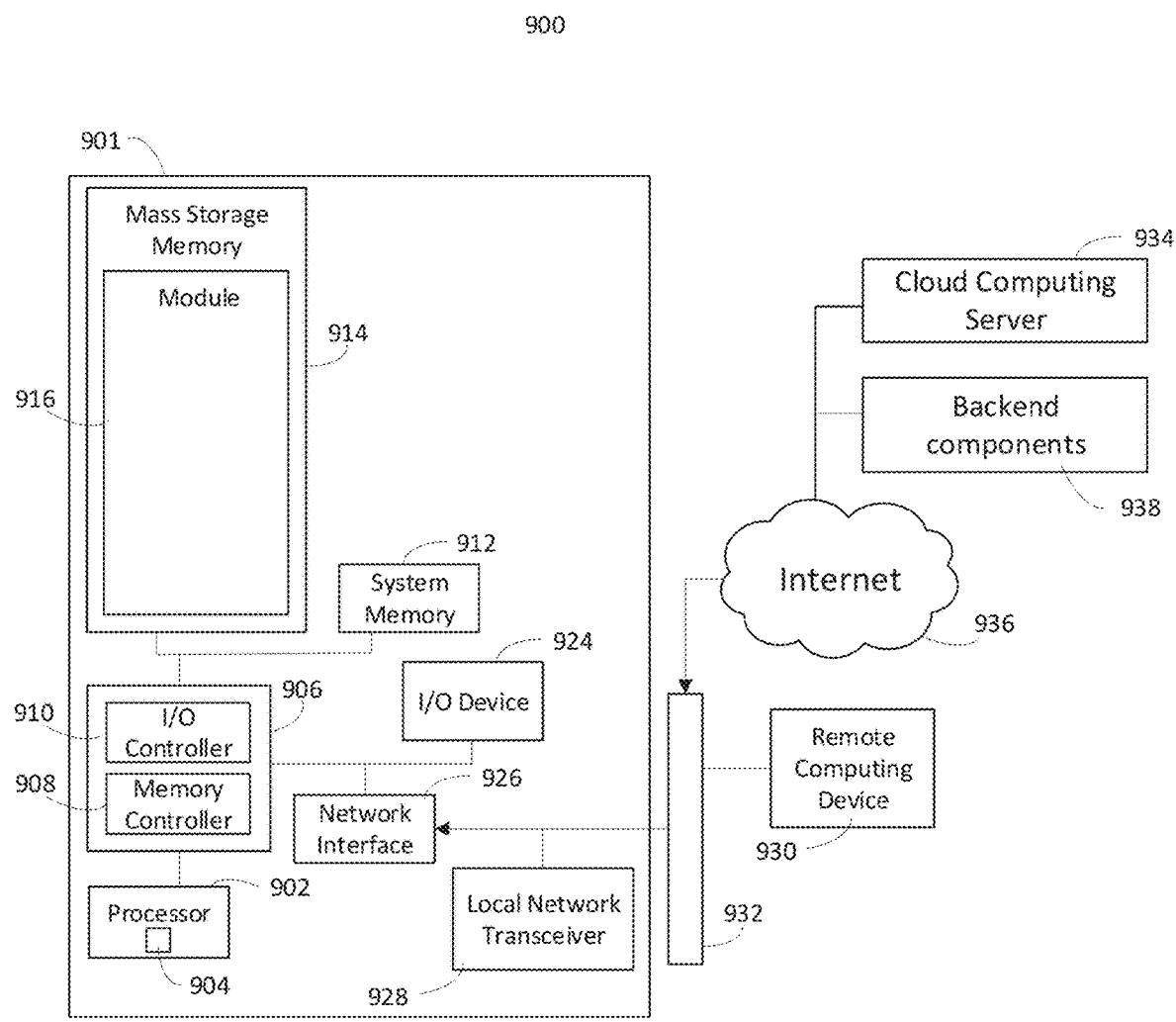
FIG. 7 is an illustration of a sample computing device according to one or more embodiments.

As illustrated in FIG. 1, many computers may be used by the system. FIG. 7 may illustrate a sample computing device 901. The computing device 901 includes a processor 902 that is coupled to an interconnection bus. The processor 902 includes a register set or register space 904, which is depicted in FIG. 7 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 7 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 7 as separate functional blocks within the chipset 906, the functions performed by these blocks may be integrated within a single integrated circuit or may be implemented using two or more separate integrated circuits. The computing environment 900 may also implement the module 916 on a remote computing device 930.

The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system comprising a server including one or more processors, the one or more processors programmed or configured to:
   receive a plurality of computer-based updates;
   test the plurality of computer-based updates offline on an offline specific testing computing device, wherein the offline specific testing computing device is physically configured to mimic a specific online computing device that issued a plurality of computer-based errors in error reports from executing the plurality of computer-based updates;
   determining an approved computer-based update from the plurality of computer-based updates;
   upon determining the approved computer-based update from the plurality of computer-based updates:
      add the approved computer-based update to a fix database, and
      add the approved computer-based update to a first implementation schedule for the specific online computing device;
   receive a plurality of computer-based error reports;
   determine a plurality of solutions to the plurality of computer-based errors in the error reports;
   test offline the plurality of solutions on the offline specific testing computing device;
   determine an optimal error solution based on the offline test of the plurality of solutions on the offline specific testing computing device;
   determine that the optimal error solution is approved;
   based on the determination that the optimal error solution is approved:
      add the optimal error solution to the fix database,
      take the specific online computing device offline,
      determine an alternative online computing device for the specific online computing device that was taken offline,
      add the optimal error solution to the first implementation schedule for the alternative online computing device,
      determine, based on the fix database, a network member online computing device that issued at least one of the plurality of computer-based errors in error reports from executing the plurality of computer-based updates, wherein the specific online computing device and the network member online computing device are members of a private network, and
      add the approved computer-based update to the first implementation schedule for the network member online computing device;
   analyze the first implementation schedule;
   rank the optimal error solution and the approved computer-based update on the first implementation schedule based on a risk priority;
   determine a second implementation schedule for the optimal error solution and the approved computer-based update based on the risk priority;
   determine possible conflicts among the optimal error solution and the approved computer-based update on the second implementation schedule by testing both the optimal error solution and the approved computer-based update offline on the offline specific testing computing device;
   determine a final order for implementing each of the optimal error solution and the approved computer-based update; and
   implement the optimal error solution and computer-based update on the specific online computing device and the alternative online computing device according to the final order for implementing each of the optimal error solution and the approved computer-based update based on the second implementation schedule.

2. The system of claim 1, wherein the one or more processors is further programmed to create a user interface to illustrate planned implementation of the optimal error solution and the approved computer-based update for the specific online computing device, the alternative online computing device, and the network member online computing device.

3. The system of claim 1, wherein the fix database is available to additional computers.

4. The system of claim 3, wherein the one or more processors is configured to:
  access a second computer;
  analyze the second computer for updates and error solutions;
  create a fix determination indicating that updates and error solutions are needed on the second computer;
  based on the fix determination that the updates and error solutions are needed on the second computer:
    access the fix database to access the approved computer-based update and the optimal error solution,
    determine an order of the updates and error solutions,
    determine a time for implementing the updates and the error solutions on the second computer, and
    implement the updates and the error solutions on the second computer.

5. The system of claim 1, wherein the specific online computing device and the alternative online computing device are on the private network.

6. The system of claim 1, wherein the specific online computing device and the alternative online computing device execute proprietary software.

7. The system of claim 1, wherein artificial intelligence is used to determine the order of the approved computer-based update and the optimal error solution.

8. A computer-based method for testing updates and solutions on a private network comprising computer executable blocks to physically configure a processor to:
  receive a plurality of computer-based updates and an optimal error solution to a plurality of computer-based errors in error reports;
  test the plurality of computer-based updates and the optimal error solution offline on an offline specific testing computing device, wherein the offline specific computing device is physically configured to mimic a specific online computing device that issued the plurality of computer-based errors in error reports;
  determine an approved computer-based update from the plurality of computer-based updates;
  upon determining the approved computer-based update from the plurality of computer-based updates:
    add the approved computer-based update to a fix database,
    take the specific online computing device offline,
    determine an alternative online computing device for the specific online computing device that was taken offline,
    add the approved computer-based update to a first implementation schedule for the specific online computing device,
    determine, based on the fix database, a network member online computing device that issued at least one of the plurality of computer-based errors in error reports from executing the plurality of computer-based updates, wherein the specific online computing device and the network member online computing device are members of the private network, and
    add the approved computer-based update to the first implementation schedule for the network member online computing device;
  analyze the first implementation schedule;
  rank the optimal error solution and the approved computer-based update on the first implementation schedule based on a risk priority;
  determine a second implementation schedule for the optimal error solution and the approved computer-based update based on the risk priority;
  determine possible conflicts among the optimal error solution and the approved computer-based update on the second implementation schedule by testing both the optimal error solution and the approved computer-based update offline on the offline specific testing computing device;
  determine a final order for implementing each of the optimal error solution and the approved computer-based update; and
  implement the optimal error solution and the approved computer-based update on the specific online computing device and the alternative online computing device according to the final order based on the second implementation schedule.

9. The computer-based method of claim 8, wherein the processor is further programmed to create a user interface to illustrate planned optimal error solution and the approved computer-based update for the specific online computing device, the alternative online computing device, and the network member online computing device.

10. The computer-based method of claim 8, wherein the fix database is available to additional computers.

11. The computer-based method of claim 10, wherein the processor is further configured to:
  access a second computer;
  analyze the second computer for updates and error solutions;
  determine that updates and error solutions are needed on the second computer;
  based on the determination that the updates and the error solutions are needed on the second computer:
    access the fix database to access the approved computer-based update and the optimal error solution,
    determine an order of the updates and error solutions,
    determine a time for implementing the updates and error solutions on the second computer, and
    implement the updates and the error solutions on the second computer.

12. The computer-based method of claim 8, wherein the specific online computing device and the alternative online computing device are on the private network.

13. The computer-based method of claim 8, wherein the specific online computing device and the alternative online computing device execute proprietary software.

14. The computer-based method of claim 8, wherein artificial intelligence is used to determine the order of the approved computer-based updates and the optimal error solution.

15. A non-transitory computer medium physically configured with instructions to physically configure a processor to:
  receive a plurality of computer-based updates or an optimal error solution to a plurality of computer-based errors in error reports;

test the plurality of computer-based updates or the optimal error solution offline on an offline specific testing computing device, wherein the offline specific computing device is physically configured to mimic a specific online computing device that issued the plurality of computer-based errors in error reports;

determine an approved computer-based update from the plurality of computer-based updates;

upon determining the approved computer-based update from the plurality of computer-based updates:
  add the approved computer-based updates to a fix database,
  take the specific online computing device offline,
  determine an alternative online computing device for the specific online computing device that was taken offline,
  add the approved computer-based updates to a first implementation schedule for the specific online computing device,
  determine, based on the fix database, a network member online computing device that issued at least one of the plurality of computer-based errors in error reports from executing the plurality of computer-based updates, wherein the specific online computing device and the network member online computing device are members of a private network, and
  add the approved computer-based update to the first implementation schedule for the network member online computing device;

analyze the first implementation schedule;

rank the optimal error solution and the approved computer-based update on the first implementation schedule based on a risk priority;

determine a second implementation schedule for the optimal error solution and the approved computer-based update based on the risk priority;

determine possible conflicts among the optimal error solution and the approved computer-based update on the second implementation schedule by testing both the optimal error solution and the approved computer-based update offline on the offline specific testing computing device;

determine a final order for implementing each of the optimal error solution and the approved computer-based update; and implement the optimal error solution and the approved computer-based update on the specific online computing device and the alternative online computing device according to the final order based on the second implementation schedule.

16. The non-transitory computer-readable medium of claim 15, wherein the processor is further programmed to create a user interface to illustrate planned optimal error solution or the approved computer-based update for the specific online computing device, the alternative online computing device, and the network member online computing device.

17. The non-transitory computer readable medium of claim 15, wherein the fix database is available to additional computers.

18. The non-transitory computer readable medium of claim 15, wherein one or more of the processors is configured to:
  access a second computer;
  analyze the second computer for updates or error solutions;
  determine that updates or error solutions are needed on the second computer;
  based on the determination that the updates or the error solutions are needed on the second computer:
    access the fix database to access the approved computer-based update and the optimal error solution,
    determine an order of the updates or error solutions,
  determine a time for implementing the updates or error solutions on the second computer, and
  implement the updates or the error solutions on the second computer.

19. The non-transitory computer readable medium of claim 15, wherein the specific online computing device and the alternative online computing device are on the private network and the specific online computing device and the alternative online computing device execute proprietary software.

20. The non-transitory computer readable medium of claim 15, wherein artificial intelligence is used to determine the order of the computer-based updates and error solutions.

\* \* \* \* \*